(12) United States Patent
Fanslau, Jr.

(10) Patent No.: US 8,310,790 B1
(45) Date of Patent: Nov. 13, 2012

(54) REMOTE DRIVE ROTARY HEAD DUAL STAGE ACTUATOR

(75) Inventor: Edmund B Fanslau, Jr., San Jose, CA (US)

(73) Assignee: NHK Spring Co., Ltd, Yokohama (JP)

( * ) Notice: Subject to any disclaimer, the term of this patent is extended or adjusted under 35 U.S.C. 154(b) by 0 days.

(21) Appl. No.: 13/158,406

(22) Filed: Jun. 11, 2011

(51) Int. Cl.
*G11B 21/24* (2006.01)

(52) U.S. Cl. ..................................... 360/294.4

(58) Field of Classification Search ............. 360/294.4, 360/294.3, 244.2, 236.5, 245.8, 244.5, 245.3, 360/244.8, 294.7, 294.1, 244.7
See application file for complete search history.

(56) References Cited

U.S. PATENT DOCUMENTS

| | | | |
|---|---|---|---|
| 6,376,964 B1 | 4/2002 | Young et al. | |
| 6,600,619 B1 * | 7/2003 | Morris et al. | 360/75 |
| 6,760,196 B1 | 7/2004 | Niu et al. | |
| 6,950,266 B1 | 9/2005 | McCaslin et al. | |
| 7,006,333 B1 | 2/2006 | Summers | |
| 7,038,888 B2 | 5/2006 | Ma | |
| 7,057,857 B1 | 6/2006 | Niu et al. | |
| 7,466,520 B2 | 12/2008 | White et al. | |
| 2005/0105217 A1 | 5/2005 | Kwon et al. | |
| 2006/0072247 A1 | 4/2006 | Yao et al. | |
| 2006/0193086 A1 | 8/2006 | Zhu et al. | |
| 2007/0030601 A1 | 2/2007 | Honda | |
| 2007/0223146 A1 | 9/2007 | Yao et al. | |
| 2008/0278864 A1 * | 11/2008 | Zhang et al. | 360/324.12 |
| 2009/0244786 A1 | 10/2009 | Hatch | |
| 2010/0097727 A1 | 4/2010 | Greminger | |
| 2010/0177449 A1 * | 7/2010 | Zhao et al. | 360/324.12 |
| 2012/0009337 A1 * | 1/2012 | Zhang et al. | 427/131 |

* cited by examiner

*Primary Examiner* — Allen Cao
(74) *Attorney, Agent, or Firm* — Sughrue Mion, PLLC

(57) ABSTRACT

A gimbal assembly of a dual-stage microactuator is provided with a remotely-located piezoelectric transducer (PZT) and at least one actuation strut connecting an asymmetrical amplification structure supporting the PZT to a tongue supporting a slider, such that the movement of the PZT over the asymmetrical amplification structure is amplified by the asymmetrical amplification structure and at least one actuation strut into rotation of the tongue and slider. A plurality of actuation struts connect opposing sides of the asymmetrical amplification structure with opposing sides of the tongue, which causes the tongue to rotate about a central portion of the tongue upon which a dimple of a supporting loadbeam contacts the tongue.

18 Claims, 12 Drawing Sheets

REMOTE DRIVE ROTARY HEAD DUAL STAGE ACTUATOR

BACKGROUND

1. Field of the Invention

This invention relates to a dual-stage microactuator, and more specifically to a microactuator with a remotely-located piezoelectric transducer (PZT) and an amplification structure amplifying the movement of the PZT to provide rotation of a tongue about a dimple on a head of the microactuator.

2. Description of the Related Art

In a hard disk drive assembly, dual-stage microactuators provide two areas of actuation, or movement, of a read/write head which permit the head to move from track to track over a platter on which data is stored. A finer level of movement is achieved at a tip of the head, or slider, usually as a result of a piezoelectric transducer (PZT) mechanism. Activation of the PZT is translated into movement of the slider, and this permits finer movement across tracks on the platter, which allows tracks to be spaced closer together, thus enabling more data to be stored on a platter.

However, movement of the PZT and the structures which translate the PZT movement to the slider also create vibration of the microactuator, which causes latency, or delays in the movement of the head from track to track. If the head doesn't properly read the track, it must wait for the platter to spin around another revolution before it can attempt to read the correct track again. This latency thus results in slower speeds when reading and writing data to the hard disk drive, which slows the overall computing process. Vibration and movement is also translated from the PZT away from the head and back to the base of the microactuator, which again degrades the read/write speed of the hard disk drive.

SUMMARY

A gimbal assembly of a dual-stage microactuator is provided with a remotely-located piezoelectric transducer (PZT) and at least one actuation strut connecting an asymmetrical amplification structure supporting the PZT to a tongue supporting a slider, such that the movement of the PZT over the asymmetrical amplification structure is amplified by the asymmetrical amplification structure and at least one actuation strut into rotation of the tongue and slider. A plurality of actuation struts connect opposing sides of the asymmetrical amplification structure with opposing sides of the tongue, which causes the tongue to rotate about a central portion of the tongue upon which a dimple of a supporting loadbeam contacts the tongue.

In one embodiment of the invention, a gimbal assembly of a dual-stage microactuator comprises a tongue upon which a slider is contactingly attached; an asymmetrical amplification structure upon which a piezoelectric transducer (PZT) is contactingly attached, the asymmetrical amplification structure comprising a left PZT mounting pad and a right PZT mounting pad; a first actuation strut connecting the left PZT mounting pad with a left portion of the tongue; a second actuation strut connecting a right PZT mounting pad with a right portion of the tongue; and a tongue pivot support connecting a middle portion of the asymmetrical amplification structure with a middle portion of the tongue.

The asymmetrical amplification structure may impart a rotary motion to the tongue during actuation of the PZT.

The rotary motion of the asymmetrical amplification structure may rotate the tongue about a central portion of the tongue which contacts a dimple of a supporting loadbeam.

The asymmetrical amplification structure may be disposed in a width-wise direction across the gimbal assembly.

The first actuation strut may connect the left PZT mounting pad with a lower left edge of the tongue, and the second actuation strut may connect the right PZT mounting pad with a lower right edge of the tongue.

The first actuation strut may connect the left PZT mounting pad with a lateral left edge of the tongue, and the second actuation strut may connect the right PZT mounting pad with a lateral right edge of the tongue.

The slider and PZT may be contactingly attached with their respective tongue and asymmetrical amplification structures on a same side of the gimbal assembly.

In another embodiment of the invention, a gimbal assembly of a dual-stage microactuator comprises a tongue upon which a slider is contactingly attached; an asymmetrical amplification structure upon which a piezoelectric transducer (PZT) is contactingly attached, the asymmetrical amplification structure comprising a left PZT mounting pad and a right PZT mounting pad; a tongue pivot support connecting a middle portion of the asymmetrical amplification structure with a middle portion of the tongue; a first PZT support strut connecting a left PZT mounting pad with a base portion of the gimbal assembly; a second PZT support strut connecting a right PZT mounting pad with the base portion of the gimbal assembly; a first stabilizing support strut connecting a left side of the base portion of the gimbal assembly with a left portion of the tongue; and a second stabilizing support strut connecting a right side of the base portion of the gimbal assembly with a right portion of the tongue.

In yet another embodiment of the invention, a gimbal assembly of a dual-stage microactuator comprises a tongue upon which a slider is contactingly attached; an asymmetrical amplification structure upon which a piezoelectric transducer (PZT) is contactingly attached, the asymmetrical amplification structure comprising a n upper PZT mounting pad, a lower PZT mounting pad and a center support bar disposed between the upper PZT mounting pad and lower PZT mounting pad; a first actuation strut connecting a left portion of the center support bar with a left portion of the tongue; and a second actuation strut connecting a right portion of the center support bar with a right portion of the tongue; wherein the lower PZT mounting pad is a base portion of the gimbal assembly.

The first actuation strut may connect the left portion of the center support bar with a lateral left edge of the tongue, and the second actuation strut may connect the right portion of the center support bar with a lateral right edge of the tongue.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. Specifically.

In the following detailed description, reference will be made to the accompanying drawings. The aforementioned accompanying drawings show by way of illustration, and not by way of limitation, specific embodiments and implementations consistent with principles of the present invention.

DETAILED DESCRIPTION

The embodiments and implementations described above are presented in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense.

A remotely-driven rotary head dual-stage microactuator suspension, and more specifically a head gimbal assembly (HGA), is described herein. The HGA includes, in one embodiment, a single piezoelectric transducer (PZT) which is positioned away from a slider in order to reduce the stress on the slider and tongue assembly on the microactuator head. To effectuate movement of the slider and tongue with a remotely-located PZT, actuation struts are provided which connect a mounting structure for the PZT with the tongue and function as amplification structures to amplify the movement of the PZT. The mounting structure of the PZT is also configured asymmetrically to amplify the movement of the PZT.

The location and configuration of the PZT support structure and the actuation struts create amplified movement of the tongue which causes the tongue to rotate around center point which contacts a dimple on an adjacent loadbeam, thus reducing wear and tear on the tongue and dimple and minimizing a reaction force on the suspension of the microactuator. The location of the PZT away from the tongue and slider reduces the weight on the tongue, avoiding potential deformation of the air bearing surface (ABS) of the slider and providing for finer movement of the tongue that requires less force to accomplish. The PZT may also then be located on a same side of the HGA as the slider, providing for easier manufacturing and providing for a thinner HGA which can better fit between platters on a hard disk drive. Furthermore, the amplification of the movement of the PZT by the actuation struts reduces the force needed by the PZT to effectuate a required movement, thus reducing the power requirements of the PZT and increasing the strength and stability of the PZT.

I. Gimbal Head Assembly Overview

Figure 1:
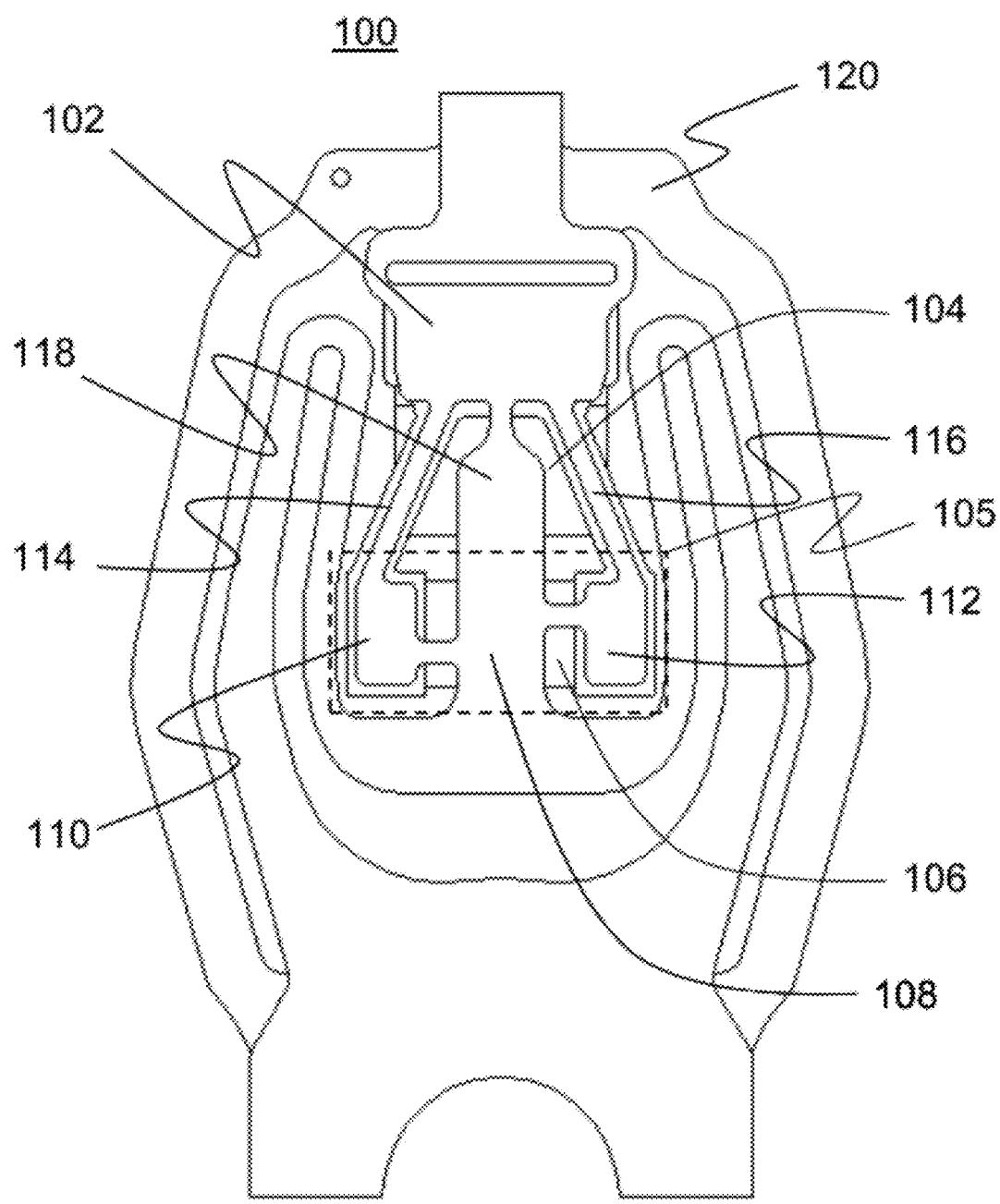
FIG. 1 illustrates a top-down view of a gimbal assembly, including a tongue, PZT support structure, actuation struts and tongue pivot support, according to one embodiment of the invention.

FIG. 1 illustrates a top-down view of one embodiment of a gimbal assembly 100 which includes a tongue 102 upon which a slider 104 is mounted. The slide 104 is mounted to a lower side of the gimbal assembly 100, as can be more clearly seen in FIGS. 2, 3B and 4A. Located away from the tongue 102 is a PZT mounting structure 105 upon which a PZT 106 is mounted. Similar to the slider 104, the PZT is located on a lower side of the gimbal assembly 100, as is more clearly illustrated in FIGS. 2, 3B and 4A. In this embodiment, the PZT mounting structure 105 is disposed in a width-wise direction across the gimbal assembly 100. The PZT mounting structure 105 may include a central support 108 connected with a first PZT mounting pad 110 and a second PZT mounting pad 112, each of which extends from the central support 108 in opposite directions. The PZT mounting pads are directly connected with the PZT 106 at opposite ends of the PZT. 106. The PZT mounting structure 105 is designed such that the PZT mounting pads 110, 112 extend asymmetrically from the central support 108, as can be illustrated more clearly in 4.

Each PZT mounting pad 110, 112 is connected with the tongue by an actuation strut, which amplifies the movement of the PZT to movement of the tongue and therefore the slider. As shown in FIG. 1, a first actuation strut 114 and a second actuation strut 116 are located on either side of the gimbal assembly 100 and connect their respective first and second PZT mounting pads 110, 112 with the tongue 102. The actuation struts translate and amplify the movement of the PZT mounting pads 110 and 112 to the tongue 102, as will be described in more detail below. Also disposed on the gimbal assembly 100 is a tongue pivot support 118 which connects the central support 108 of the PZT mounting structure 105 with a central front edge of the tongue 102. An outer ring 120 in FIG. 1 includes the wire traces that are run form the tip of the read/write head on the slider 106 back to the back of the assembly.

Figure 2:
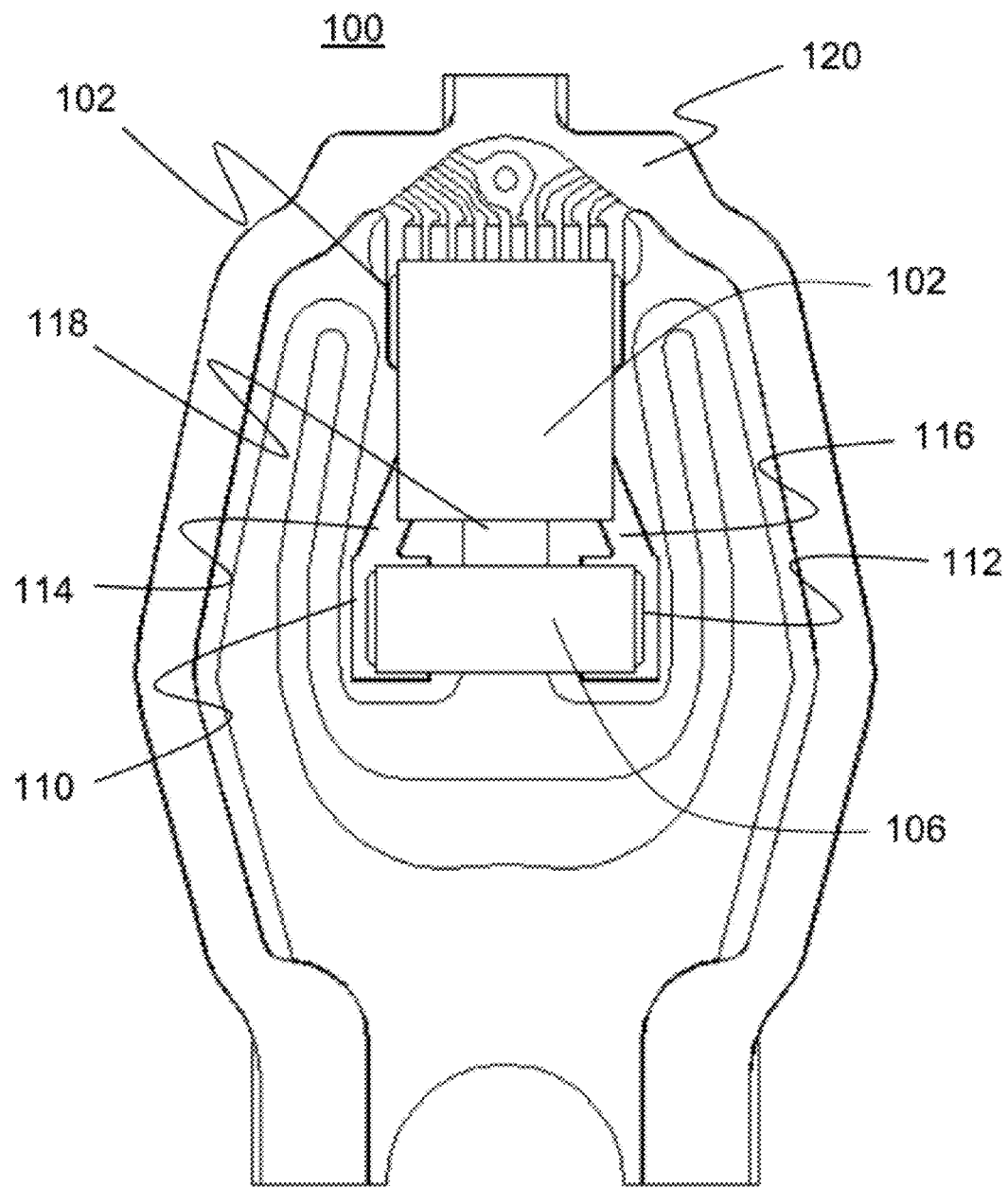
FIG. 2 illustrates a bottom-up view of the gimbal assembly of FIG. 1, further illustrating a piezoelectric transducer (PZT) and a slider, according to one embodiment of the invention.
Figure 3A:
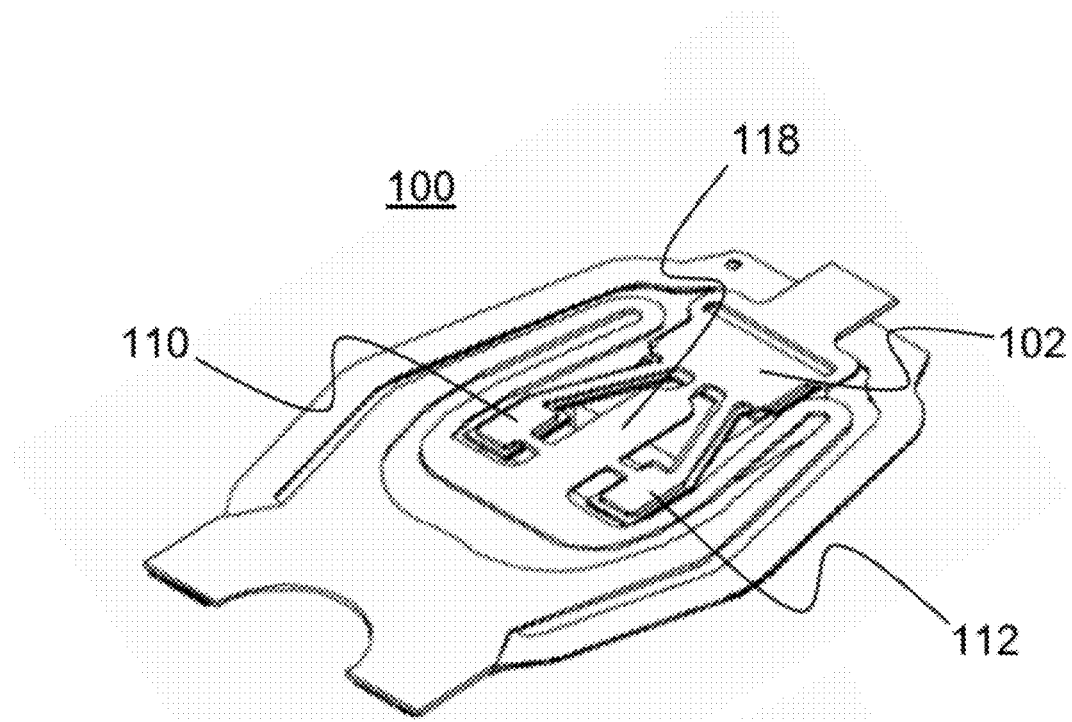
FIG. 3A illustrates a top perspective view of the gimbal assembly, according to one embodiment of the invention.
Figure 3B:
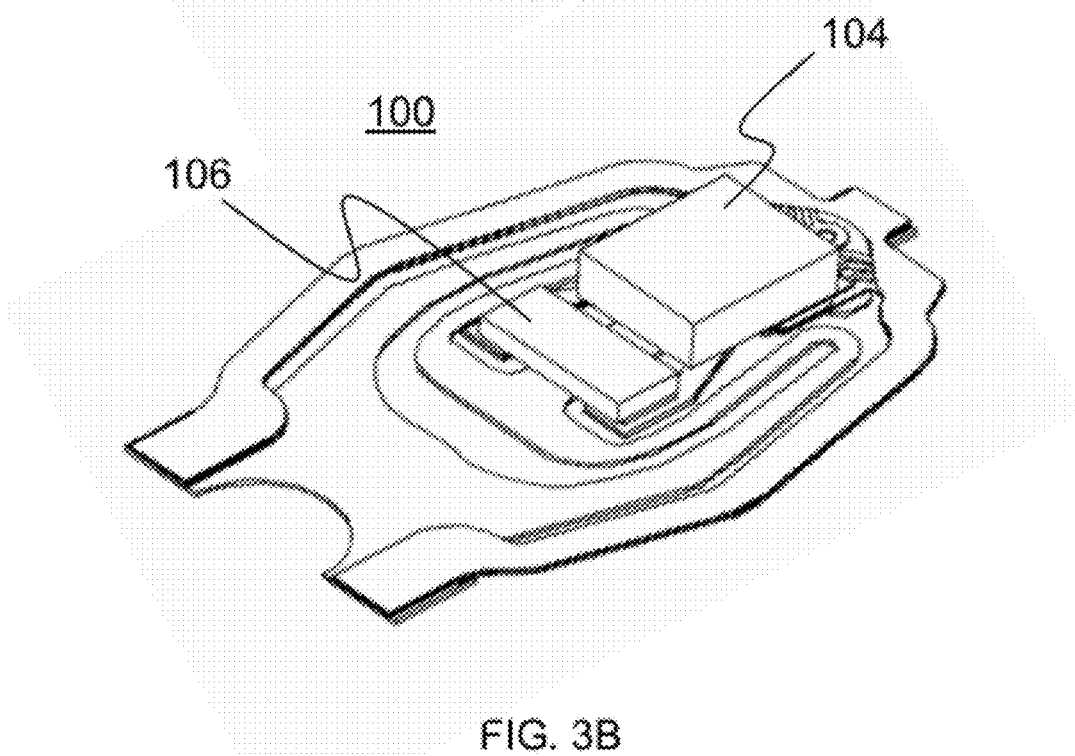
FIG. 3B illustrates a bottom perspective view of the gimbal assembly with the PZT and slider positioned thereon, according to one embodiment of the invention.
Figure 4A:
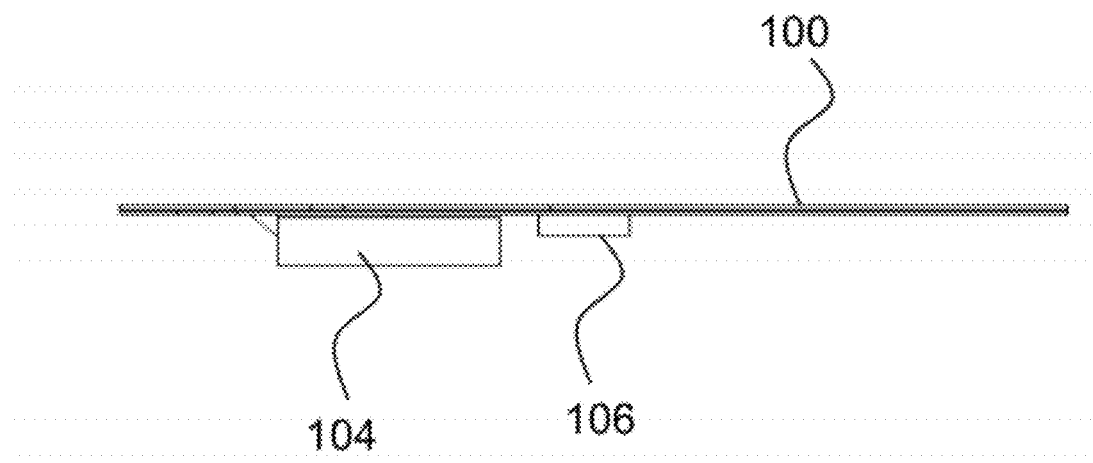
FIG. 4A illustrates a lateral view of the gimbal assembly depicting the location of the slider and PZT, according to one embodiment of the invention.
Figure 4B:
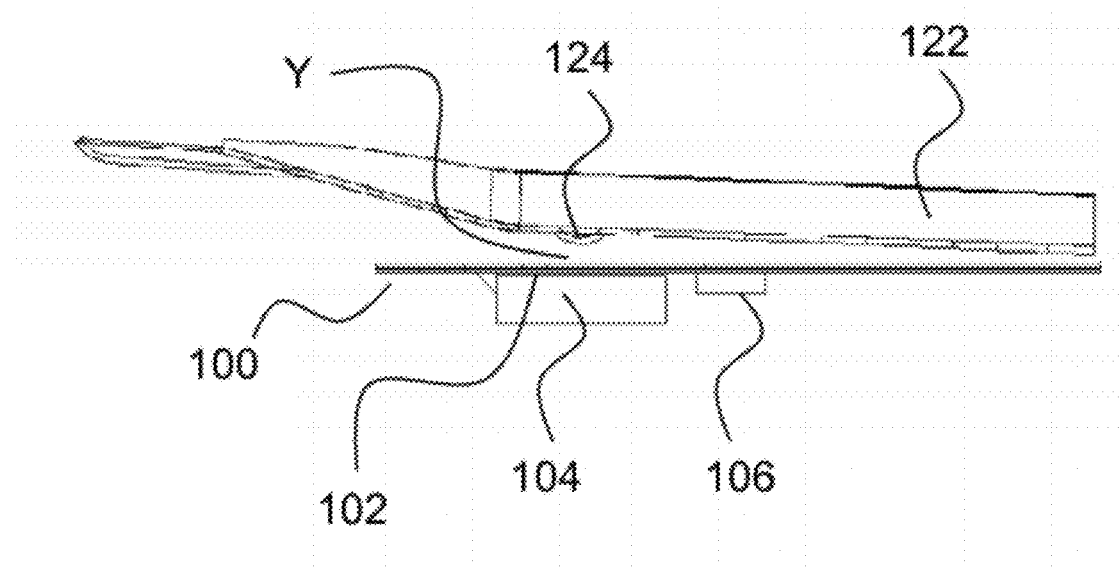
FIG. 4B illustrates a lateral view of the gimbal assembly connected with a loadbeam and comprising a loadbeam dimple which contactingly interacts with the tongue.

FIG. 2 illustrates a bottom-up view of the gimbal assembly 100 of FIG. 1, primarily illustrating the lower side of the gimbal assembly. The slider 104 and PZT 106 are both now clearly visible, as they are connected with the lower side of the gimbal assembly. FIG. 3A is an illustration of a perspective view of an upper side of a gimbal assembly, while FIG. 3B is an illustration of a perspective view of the lower side of the gimbal assembly. FIG. 4A illustrates a side view of the gimbal assembly 100 which also illustrates the location of the slider 104 and the PZT 106. FIG. 4B illustrates one embodiment where the gimbal assembly 100 is shown positioned immediately below at loadbeam 122 which includes a dimple 124 that comes into contact with the gimbal assembly 100.

A benefit of locating the PZT 106 away from the tongue 102 and slider 104 is that the weight supported by the tongue is reduced, which reduces the vibration of the tongue during movement and thus reduces the vibration and movement which is transmitted through the dimple 124 and back through the loadbeam 122. Likewise, having the PZT 106 remote to the tongue 102 also prevents shock movements at the slider 104 from being translated directly to the fragile PZT 106 (generally a thin, breakable ceramic material), thus reducing the risk of structural failure of the PZT 106. Furthermore, locating the PZT 106 away from the slider 104 allows for the PZT 106 and slider 104 to be mounted to the same side of the gimbal assembly 100, as shown in FIG. 4A, which reduces the complexity of manufacturing the HGA and provides for a thinner HGA (as opposed to stacking the PZT and slider on top of each other) which can more easily fit between multiple platters on a hard disk drive. Stacking the PZT and slider together underneath the tongue also creates torsion frequency problems which causes the slider to move off of a track.

Figure 5:
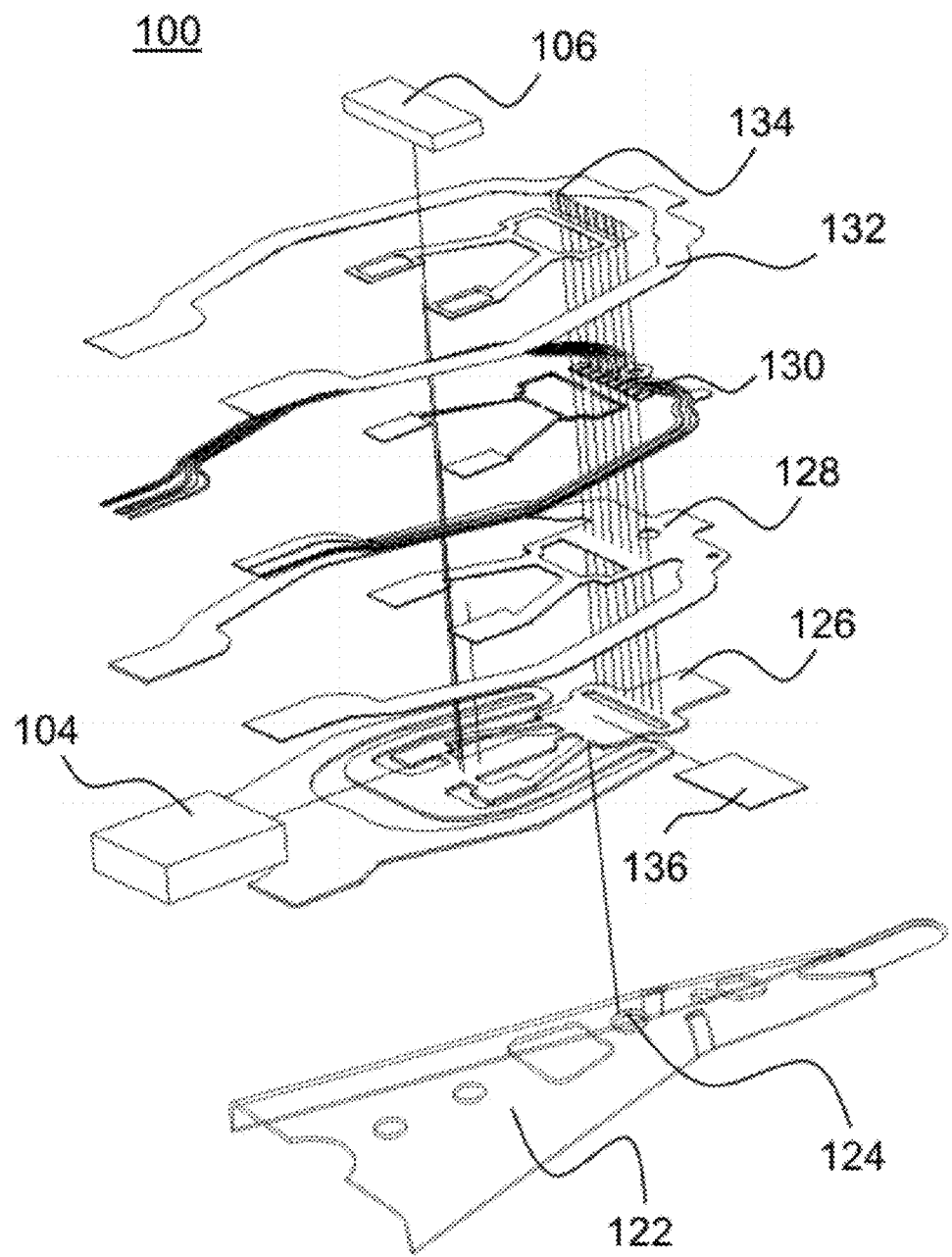
FIG. 5 illustrates an exploded perspective view depicting the layers of the gimbal assembly, the positioning of the PZT and slider, and the presence of the loadbeam and dimple, according to one embodiment of the invention.

FIG. 5 is an exploded view of the gimbal assembly 100 which illustrates the structure of the multiple layers and peripheral components. In one embodiment, the layers include a stainless steel layer 126, an insulation layer 128, a circuit layer 130, and a cover plate 132. Solders 134 are provided to provide electrical contact between the slider 104 and the wires in the circuit layer 130. FIG. 5 also illustrates the alignment of the gimbal assembly 100 with the load beam 122 and dimple 124. As can be seen by line A, the dimple 124 is located such that it comes into contact with a top side of the tongue 102 (the exploded view of the gimbal assembly in FIG. 5 is illustrated in an upside-down position simply for clarity) In one embodiment, an adhesive 136 is provided to attach the slider 104 to the tongue 102.

PZT Mounting Structure

Figure 6:
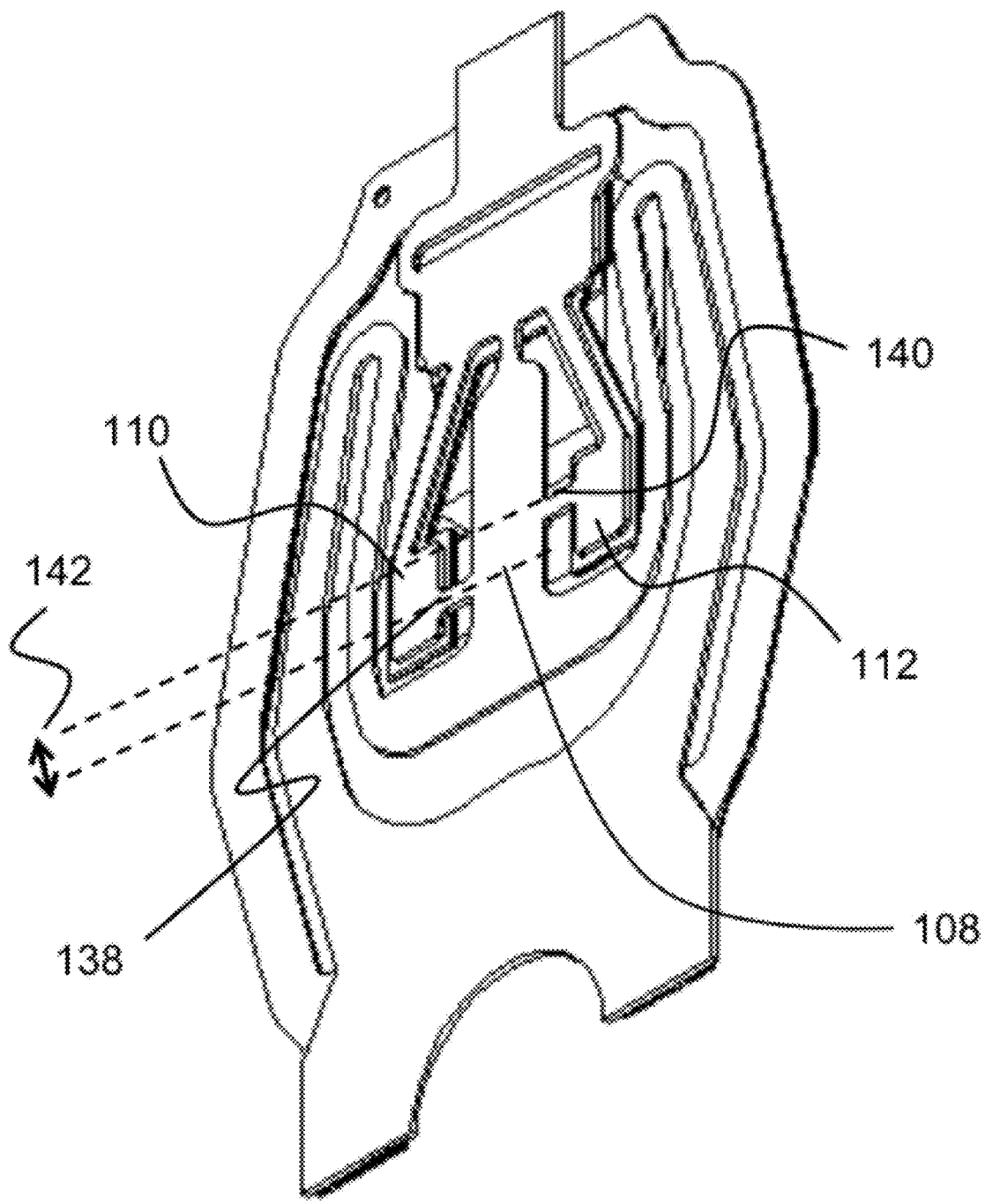
FIG. 6 illustrates an asymmetry of the PZT support structure and an offset created by the asymmetry of two PZT support pads, according to one embodiment of the invention.

FIG. 6 illustrates the force asymmetry of the PZT mounting pads 110 and 112. The PZT mounting structure 105 acts as an asymmetrical amplification structure that amplifies the movement of the PZT into a rotary motion which is then transferred to the tongue via the actuation struts. Each mounting pad is connected with the central support 108 by a first connecting arm 138 and second connecting arm 140 which extend away from the central support in opposing directions. More particularly, the connecting arms 138 and 140 extend away from the central support at an offset distance 142, with a first connecting arm 138 extending from a lower left side portion of the central support 108 and a second connecting arm 140 extending from an upper right side portion of the central support. This offset 142 provides an asymmetry to the PZT mounting structure 105 such that when the PZT 106 is mounted to the PZT mounting pads 110 and 112, the actuation of the PZT in a lateral direction induces a rotary motion, illustrated by arrow 144 in FIG. 7.

Figure 7:
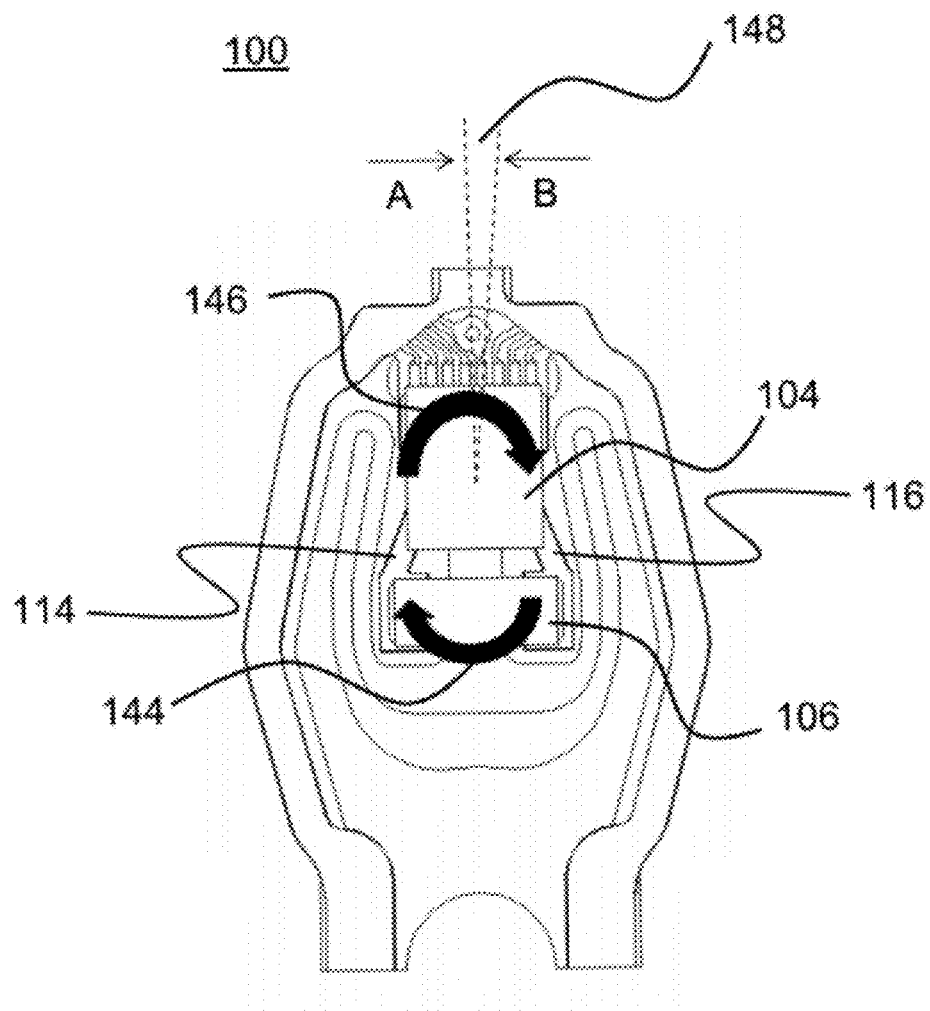
FIG. 7 is an illustration of the rotation of the tongue about a dimple, according to one embodiment of the invention.

The rotary motion 144 is then translated through the actuation struts 114 and 116 into a rotary motion of the tongue 102, as illustrated by arrow 146 in FIG. 7. As the tongue 104 rotates, a lateral movement of the tongue in the direction of arrow A is also achieved. The lateral movement results in a displacement 148 of the tongue 102 and the slider 104 which is bonded with the tongue 102, as represented by the distance 148 between the lines extending from the slider 104. This lateral movement is the fine movement desired for a dual stage microactuator, as it allows the slider 104 to read tracks in the platter which are packed together at higher densities and with smaller widths.

It should be noted that the particular direction of rotation and lateral movement shown by arrows 144 and 146 is not fixed; as the PZT 106 is actuated by an electrical charge, it will expand to create one direction of rotation, such as that in arrow 144. However, once the electrical charge is terminated, the PZT 106 will retract and cause rotation in the opposite direction of arrow 144. This results in rotary motion of the tongue which is opposite to arrow 146, and lateral movement of the tongue in the direction of arrow B that is opposite to the displacement 148 currently illustrated. During operation of the microactuator, the electrical charges are applied and withdrawn as needed in order to effectuate the required movement of the slider 104 across the platter.

Figure 8:
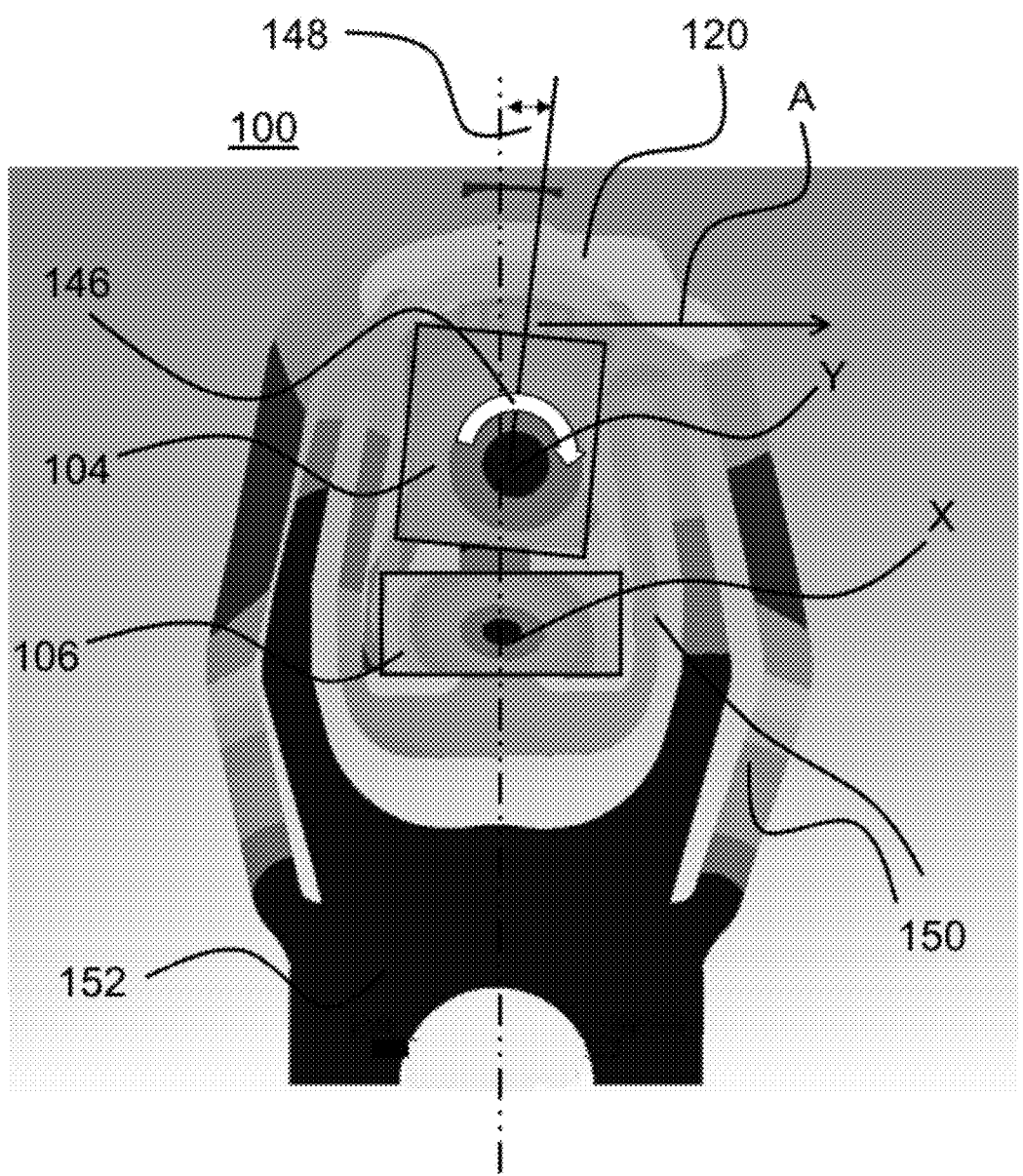
FIG. 8 is a stress diagram showing the degree of movement of the structures of the gimbal assembly as the assembly rotates about the dimple, according to one embodiment of the invention.

FIG. 8 is a stress diagram of the gimbal assembly 100 showing different shades from dark to light which correspond to the degree of movement of the various structures of the gimbal assembly during the rotary movement described above with regard to FIG. 7. The lighter shades represent larger movement, while the darker shades represent less movement—the black areas indicating essentially no movement at all. As can be seen in FIG. 8, the lighter shades appear primarily on upper sections of the gimbal assembly 100, where the slider 104 and the outer ring 120 are located. Further, movement can be seen by lighter shades on support structures 150 of the gimbal assembly 100 which connect the PZT support structure and tongue 102 with a base 152, or flexure root, of the gimbal assembly that is eventually attached with the loadbeam 122. These support structures 150 dissipate the movement of the PZT 106 to prevent motion from being transferred back to the loadbeam 122 and remainder of the suspension of the microactuator (not shown).

III. Actuation Struts

It is also important to note that the rotary movement created by the PZT 106 is centered at point X in the center of the PZT 106. The movement of the PZT 106 which is translated through the actuation struts 114 and 116 results in rotary movement 146 of the tongue 102 and slider 104 (the tongue 102 being hidden by the slider 104 in FIG. 8). The rotary movement 146 of the tongue 102 rotates around point Y in a center portion of the tongue 102, which corresponds to the location on the tongue where the dimple 124 of the loadbeam contacts the tongue 102 (see FIG. 4B). In other words, the tongue 102 rotates about the dimple 124. By rotating the tongue 102 about the dimple 124, the stress and friction of movement between the tongue 102 and dimple 124 is reduced, reducing wear on both components and preventing a buildup of high temperatures as a result of friction. The rotation about the dimple also reduces the reaction forces transmitted to the loadbeam 122 and the entire suspension.

Figure 9:
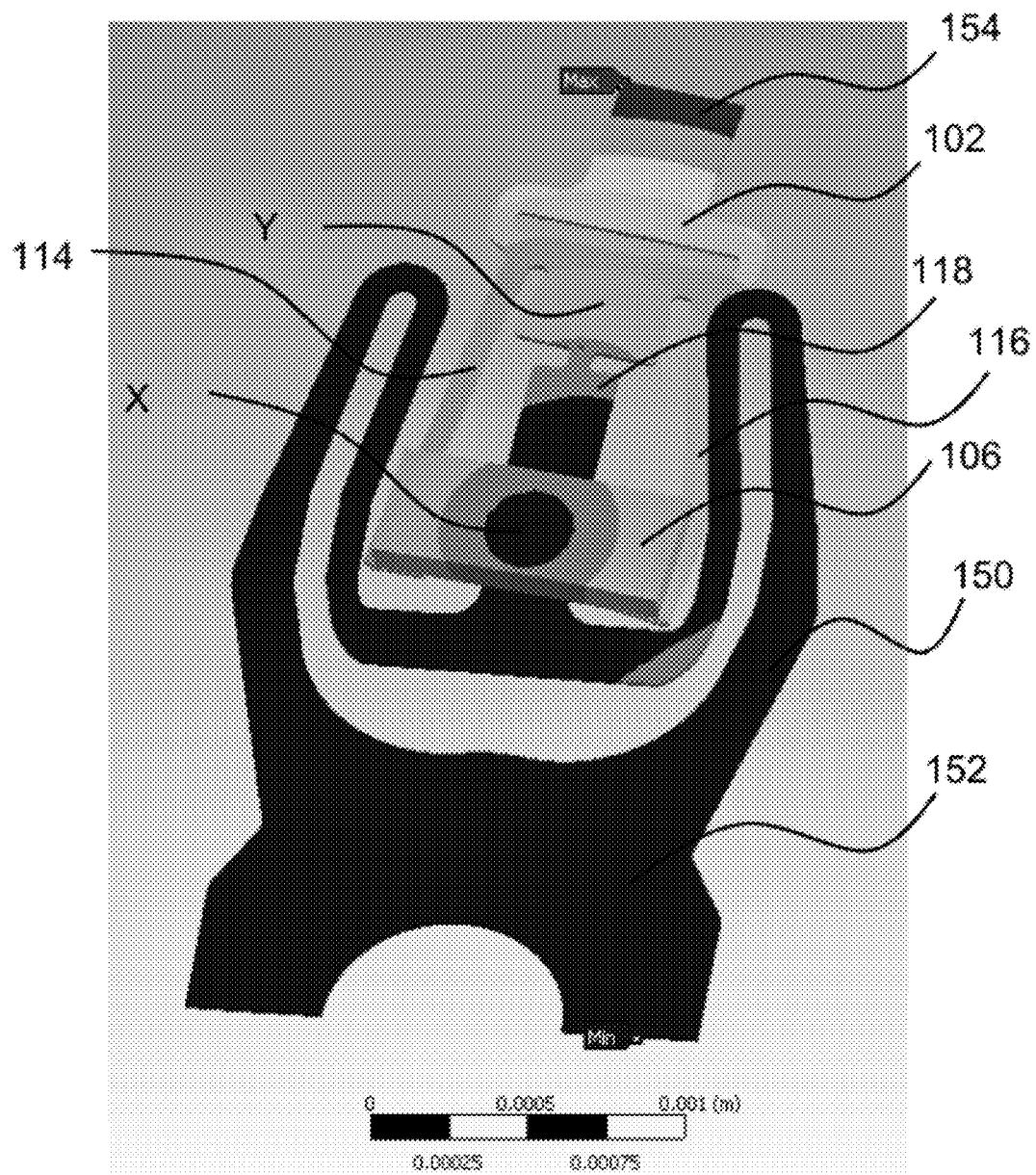
FIG. 9 illustrates a stress diagram showing the degree of movement of the tongue upon actuation by the PZT, according to one embodiment of the invention.

FIG. 9 is an additional illustration of a stress diagram showing the degree of movement of the tongue 102 upon actuation by the PZT 106. As with FIG. 8, the greater degrees of movement are generally reflected by lighter shades, although in this particular illustration, the movement at an outer end point 154 of the tongue 102 is large enough that the shading pattern begins to darken due to the significant movement experienced. FIG. 9 thus illustrates the amplification of motion caused by the actuation struts 114 and 116. The movement of the tongue 102 is greater than the movement at the PZT 106 itself, and the movement of the remainder of the gimbal assembly 100, including the support structures 150 and base 152, is negligible.

The amplification of the PZT movement by the actuation struts 114 and 116 also means that the amount of movement of the PZT 106 required to obtain sufficient movement of the tongue 102 is less than if the PZT were mounted near or directly on the tongue or slider. Therefore, less voltage can be applied to the PZT 106 in order to effectuate sufficient movement of the tongue 102. Applying less voltage is advantageous in reducing the amount of power required to operate the hard disk drive, but also equates to longer life for the PZT 106, which has a tendency to crack and break over long periods of large movement and voltages.

FIG. 9 also illustrates an alternative embodiment where the actuation struts 114 and 116 connect to different portions of the tongue 102 than the previous embodiment (see FIG. 1). In FIG. 1, the actuation struts 114 and 116 connect with a lower end of the tongue 102 which is closer to the tongue pivot support 118. In the embodiment illustrated in FIG. 9, the actuation struts 114 and 116 connect to lateral sides of the tongue 102. The location of the tongue where the actuation struts connect results in varying amounts of movement of the tongue. The closer the actuation struts are to the center of the lower end of the tongue (where the tongue pivot support is located), the greater the movement of the tongue. Similarly, the further away the actuation struts are from the center of the lower end of the tongue, the smaller the movement of the tongue. The choice of the location of the actuation struts thus depends on the amount of movement of the slider desired when applying a particular voltage to the PZT. In some applications, a finer movement may be desired, while in others, a larger movement using a lesser amount of voltage may be preferred.

IV. Tongue Pivot Support

The tongue pivot support 118 is designed to anchor the tongue 102 from a center area and encourage movement of the tongue around point Y so that the tongue rotates about the dimple 124. FIG. 9 illustrates the benefit of the tongue pivot support 118, which anchors the tongue 102 and ensures that the movement provided by the actuation struts 114 and 116 is rotational movement about the dimple. The tongue pivot support 118 realizes little or no movement, as shown by the dark shading, and thus ensures that the movement being applied to the tongue 102 is anchored around the center of the tongue Y where the dimple 124 contacts the tongue 102.

Figure 10:
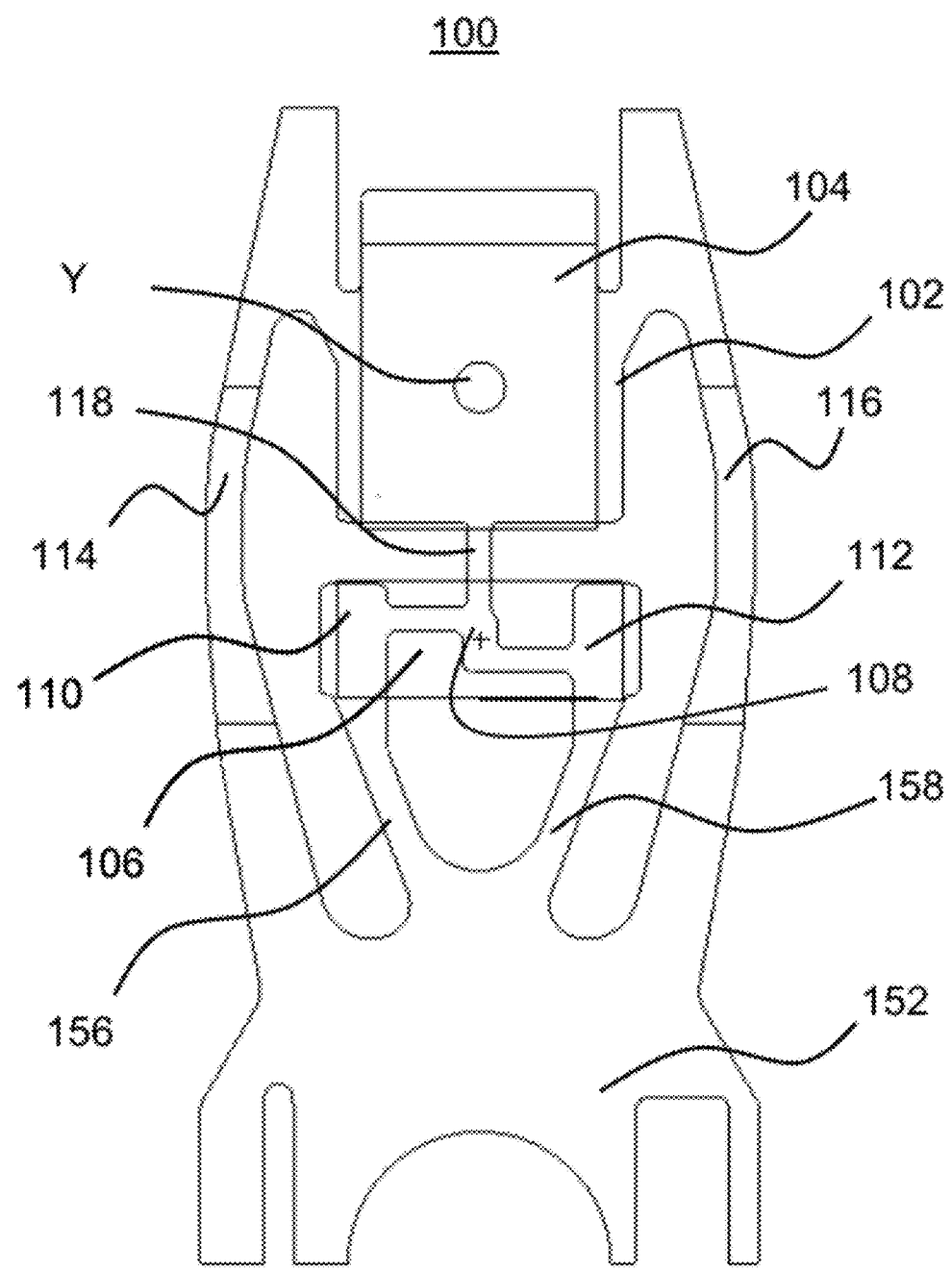
FIG. 10 illustrates another embodiment of the gimbal assembly with an alternative position for the actuation struts, according to one embodiment of the invention.

FIG. 10 illustrates another embodiment of the gimbal assembly 100 with an alternative position for the actuation struts 114 and 116. In this embodiment, the amplification of the movement from the PZT mounting pads 110 and 112 is translated to the tongue 102 by the tongue pivot support 118 as opposed to the actuation struts 114 and 116. The tongue pivot support 118 is connects a middle portion of the tongue with the center support 108 of the PZT support structure. The actuation struts 114 and 116 connect the tongue 102 with the base 152 and thus function instead as stabilizing supports, or lateral anchors, of the tongue 102, encouraging rotational movement about point Y as a result of the movement of the tongue pivot support 118. The asymmetry of the PZT support structure is maintained, and each PZT mounting pad 110 and 112 is connected with the base 152 by PZT support struts 156 and 158, which act to support the PZT mounting pads as opposed to amplifying their movement.

V. Vertically-Oriented PZT

Figure 11:
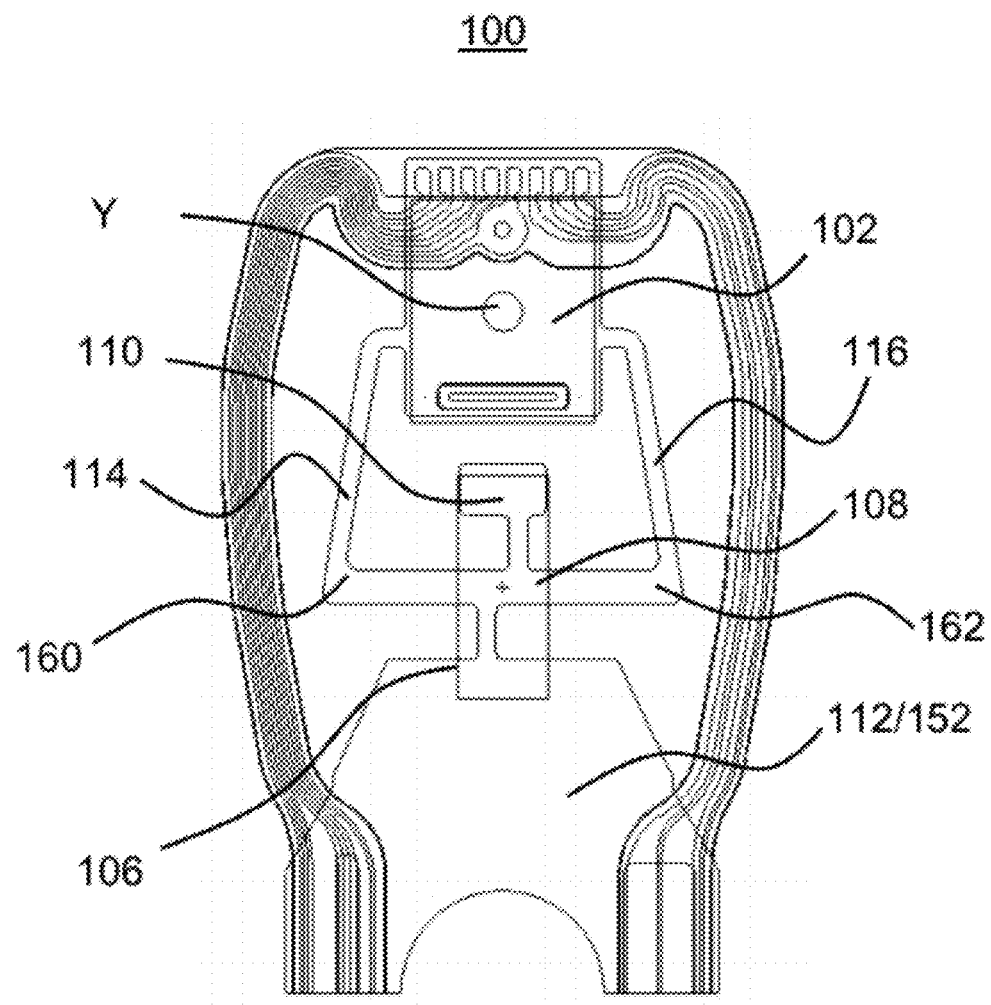
FIG. 11 illustrates yet another embodiment of the gimbal assembly with a vertically-oriented PZT structure and PZT, according to one embodiment of the invention.

FIG. 11 illustrates another embodiment of a gimbal assembly 100 with a vertically-oriented PZT 106 and PZT support structure disposed in a length-wise direction across the gimbal assembly. In this embodiment, the PZT mounting pads 110 and 112 are oriented vertically while the PZT center support 108 is arranged as a bar horizontally across the gimbal assembly 100. The actuation struts 114 and 116 connect the PZT support structure with the tongue 102 through the center support 108, with the first actuation strut 114 extending from a left end 160 of the center support 108 and the second actuation strut extending from a right end 162 of the center support 108. It is also noted that the second PZT mounting pad 112 is, in effect, the base 152.

Figure 12:
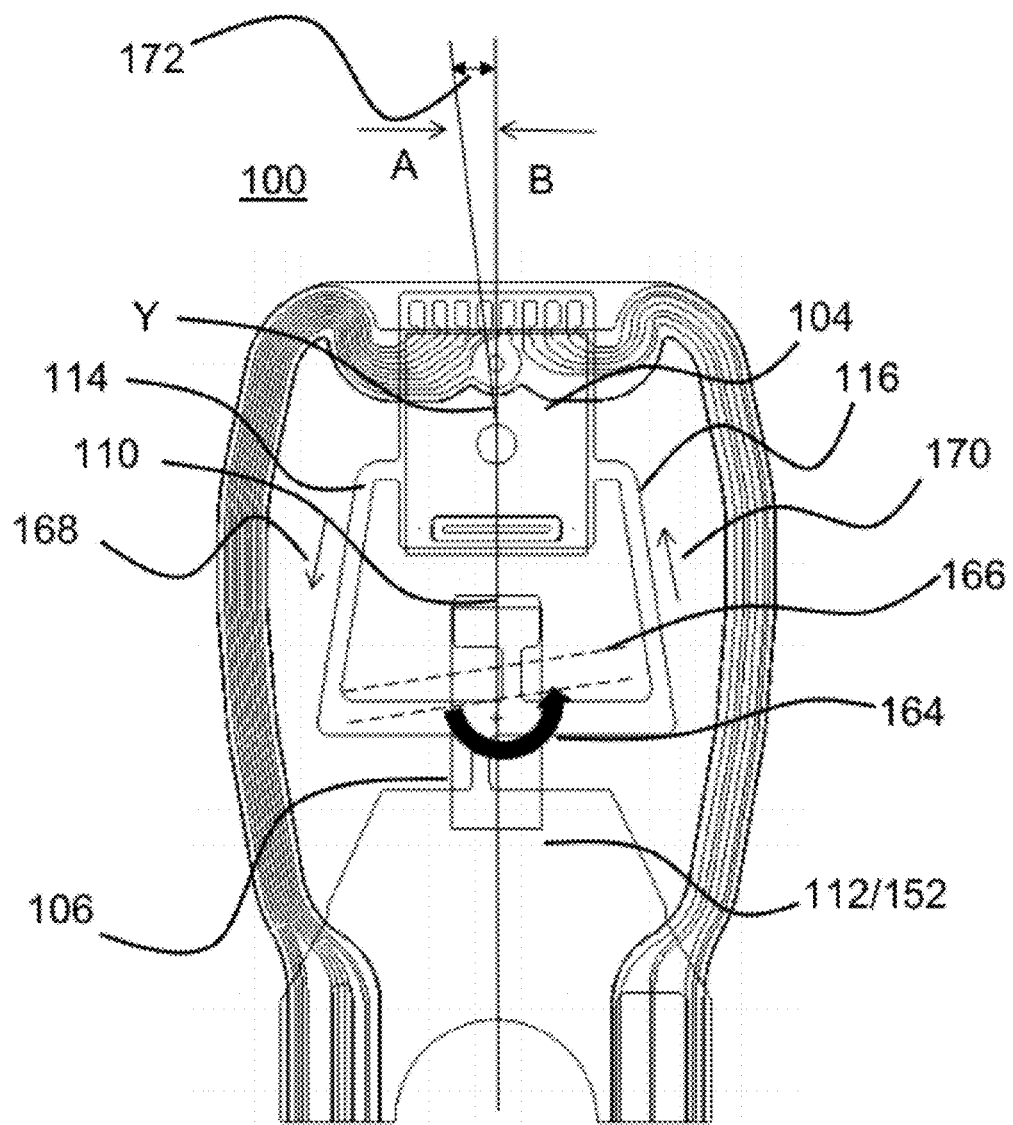
FIG. 12 illustrates the movement of the PZT and actuation struts with the vertically-oriented PZT structure depicted in FIG. 11.

As shown in FIG. 12, the embodiment with the vertically-oriented PZT 106 illustrated in FIG. 11 is still effective to actuate rotary movement from the PZT 106. The PZT 106 increases in length vertically upon actuation, which results in movement of only the unsupported PZT mounting pad 110, which effectuates rotary movement depicted by arrow 164 to the center support 108. The center support 108 is then rotated as illustrated by the dotted lines 166, which is then translated to movement of the actuation struts 114 and 116 as depicted by arrows 168 and 170. The actuation struts are connected with the tongue 102 on lateral edges, which still provides rotary movement of the tongue 102 about point Y where the dimple 124 contacts the tongue. The rotary movement of the tongue 102 results in lateral movement 172 of the tongue in the direction of arrow B.

What is claimed is:

1. A gimbal assembly of a dual-stage microactuator comprising:
   a tongue upon which a slider is contactingly attached;
   an asymmetrical amplification structure upon which a piezoelectric transducer (PZT) is contactingly attached, the asymmetrical amplification structure comprising a left PZT mounting pad and a right PZT mounting pad;
   a first actuation strut connecting the left PZT mounting pad with a left portion of the tongue;
   a second actuation strut connecting a right PZT mounting pad with a right portion of the tongue; and
   a tongue pivot support connecting a middle portion of the asymmetrical amplification structure with a middle portion of the tongue.

2. The gimbal assembly of claim 1, wherein the asymmetrical amplification structure imparts a rotary motion to the tongue during actuation of the PZT.

3. The gimbal assembly of claim 2, wherein the rotary motion of the asymmetrical amplification structure rotates the tongue about a central portion of the tongue which contacts a dimple of a supporting loadbeam.

4. The gimbal assembly of claim 1, wherein the asymmetrical amplification structure is disposed in a width-wise direction across the gimbal assembly.

5. The gimbal assembly of claim 1, wherein the first actuation strut connects the left PZT mounting pad with a lower left edge of the tongue, and wherein the second actuation strut connects the right PZT mounting pad with a lower right edge of the tongue.

6. The gimbal assembly of claim 1, wherein the first actuation strut connects the left PZT mounting pad with a lateral left edge of the tongue and the second actuation strut connects the right PZT mounting pad with a lateral right edge of the tongue.

7. The gimbal assembly of claim 1, wherein the slider and PZT are contactingly attached with their respective tongue and asymmetrical amplification structures on a same side of the gimbal assembly.

8. A gimbal assembly of a dual-stage microactuator, comprising:
   a tongue upon which a slider is contactingly attached;
   an asymmetrical amplification structure upon which a piezoelectric transducer (PZT) is contactingly attached, the asymmetrical amplification structure comprising a left PZT mounting pad and a right PZT mounting pad;

a tongue pivot support connecting a middle portion of the asymmetrical amplification structure with a middle portion of the tongue;

a first PZT support strut connecting a left PZT mounting pad with a base portion of the gimbal assembly;

a second PZT support strut connecting a right PZT mounting pad with the base portion of the gimbal assembly;

a first stabilizing support strut connecting a left side of the base portion of the gimbal assembly with a left portion of the tongue; and a second stabilizing support strut connecting a right side of the base portion of the gimbal assembly with a right portion of the tongue.

9. The gimbal assembly of claim 8, wherein the asymmetrical amplification structure imparts a rotary motion to the tongue during actuation of the PZT.

10. The gimbal assembly of claim 9, wherein the rotary motion of the asymmetrical amplification structure rotates the tongue about a central portion of the tongue which contacts a dimple of a supporting loadbeam.

11. The gimbal assembly of claim 8, wherein the asymmetrical amplification structure is disposed in a width-wise direction across the gimbal assembly.

12. The gimbal assembly of claim 8, wherein the slider and PZT are contactingly attached with their respective tongue and asymmetrical amplification structures on a same side of the gimbal assembly.

13. A gimbal assembly of a dual-stage microactuator, comprising:

a tongue upon which a slider is contactingly attached;

an asymmetrical amplification structure upon which a piezoelectric transducer (PZT) is contactingly attached, the asymmetrical amplification structure comprising an upper PZT mounting pad, a lower PZT mounting pad and a center support bar disposed between the upper PZT mounting pad and lower PZT mounting pad;

a first actuation strut connecting a left portion of the center support bar with a left portion of the tongue; and a second actuation strut connecting a right portion of the center support bar with a right portion of the tongue;

wherein the lower PZT mounting pad is a base portion of the gimbal assembly.

14. The gimbal assembly of claim 13, wherein the asymmetrical amplification structure imparts a rotary motion to the tongue during actuation of the PZT.

15. The gimbal assembly of claim 14, wherein the rotary motion of the asymmetrical amplification structure rotates the tongue about a central portion of the tongue which contacts a dimple of a supporting loadbeam.

16. The gimbal assembly of claim 13, wherein the asymmetrical amplification structure is disposed in a length-wise direction across the gimbal assembly.

17. The gimbal assembly of claim 13, wherein the first actuation strut connects the left portion of the center support bar with a lateral left edge of the tongue, and wherein the second actuation strut connects the right portion of the center support bar with a lateral right edge of the tongue.

18. The gimbal assembly of claim 13, wherein the slider and PZT are contactingly attached with their respective tongue and asymmetrical amplification structures on a same side of the gimbal assembly.

* * * * *